(12) United States Patent
Erdl et al.

(10) Patent No.: US 10,239,441 B2
(45) Date of Patent: Mar. 26, 2019

(54) ILLUMINATION DEVICE FOR A MOTOR VEHICLE

(71) Applicant: Bayerische Motoren Werke Aktiengesellschaft, Munich (DE)

(72) Inventors: Helmut Erdl, Flintsbach (DE); Abdelmalek Hanafi, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/504,495

(22) Filed: Oct. 2, 2014

(65) Prior Publication Data

US 2015/0016133 A1    Jan. 15, 2015

Related U.S. Application Data

(63) Continuation of application No. PCT/EP2013/053682, filed on Feb. 25, 2013.

(30) Foreign Application Priority Data

Apr. 3, 2012 (DE) .......................... 10 2012 205 435

(51) Int. Cl.
*B60Q 1/00* (2006.01)
*F21S 45/49* (2018.01)
(Continued)

(52) U.S. Cl.
CPC ......... *B60Q 1/0064* (2013.01); *B60Q 1/0408* (2013.01); *B60Q 11/005* (2013.01);
(Continued)

(58) Field of Classification Search
CPC ...... B60Q 1/0064; B60Q 1/0408; B60Q 1/02; B60Q 1/04; B60Q 1/045; B60Q 1/06;
(Continued)

(56) References Cited

U.S. PATENT DOCUMENTS 7,621,667 B2    11/2009   Behr et al.
8,073,300 B2    12/2011   Haerle et al.
(Continued)

FOREIGN PATENT DOCUMENTS

CN    101501392 B    11/2011
DE    101 57 314 A1    6/2003
(Continued)

OTHER PUBLICATIONS

German Search Report for Application No. 10 2012 205 435.9, dated Sep. 27, 2012, with partial English translation.
(Continued)

*Primary Examiner* — Sean P Gramling
*Assistant Examiner* — Gerald J Sufleta, II
(74) *Attorney, Agent, or Firm* — Crowell & Moring LLP

(57) ABSTRACT

An illumination device for a motor vehicle includes a light source constructed of a number of semiconductor diodes, and an optical device for generating a predefined light distribution from the light of the light source. The optical device is arranged in a housing. The illumination device is characterized in that the light source is rigidly connected to the housing. At least one optical waveguide is provided for guiding the light of the light source to the optical device.

19 Claims, 1 Drawing Sheet

(51) Int. Cl.
   *B60Q 11/00* (2006.01)
   *F21V 8/00* (2006.01)
   *B60Q 1/04* (2006.01)
   *F21S 41/14* (2018.01)
   *F21S 41/24* (2018.01)
   *F21S 41/63* (2018.01)
   *F21S 45/43* (2018.01)
   *F21S 45/47* (2018.01)
   *F21S 41/16* (2018.01)
   *F21S 45/48* (2018.01)
   *F21S 43/251* (2018.01)

(52) U.S. Cl.
   CPC .............. *F21S 41/14* (2018.01); *F21S 41/16* (2018.01); *F21S 41/24* (2018.01); *F21S 41/635* (2018.01); *F21S 45/43* (2018.01); *F21S 45/47* (2018.01); *F21S 45/48* (2018.01); *F21S 45/49* (2018.01); *G02B 6/0008* (2013.01); *F21S 43/251* (2018.01)

(58) Field of Classification Search
   CPC ....... B60Q 1/068; B60Q 1/0683; F21V 13/14; F21S 41/24; F21S 41/635
   USPC .................................... 362/459, 487, 37–60
   See application file for complete search history.

(56) References Cited

U.S. PATENT DOCUMENTS

| | | | |
|---|---|---|---|
| 2004/0008516 A1 | 1/2004 | Amano | |
| 2007/0019432 A1 | 1/2007 | Shimada | |
| 2007/0139946 A1* | 6/2007 | Basile | B60Q 1/2696 362/511 |
| 2009/0231878 A1 | 9/2009 | Van Duijneveldt | |
| 2009/0296018 A1 | 12/2009 | Harle et al. | |
| 2011/0063115 A1* | 3/2011 | Kishimoto | F21K 9/00 340/600 |
| 2011/0249460 A1* | 10/2011 | Kushimoto | B60Q 1/085 362/510 |
| 2012/0038272 A1* | 2/2012 | De Castro | F21S 48/1154 315/35 |
| 2012/0069593 A1* | 3/2012 | Kishimoto | B60Q 1/076 362/511 |
| 2012/0140504 A1* | 6/2012 | Fukai | F21V 9/16 362/516 |
| 2012/0294024 A1* | 11/2012 | Peck | F21S 48/1159 362/516 |
| 2013/0010492 A1* | 1/2013 | Montgomery | F21K 9/52 362/553 |
| 2013/0027964 A1* | 1/2013 | Toyota | G02B 6/0008 362/554 |

FOREIGN PATENT DOCUMENTS

| | | |
|---|---|---|
| DE | 10 2004 062 990 A1 | 7/2006 |
| DE | 10 2006 029 204 A1 | 1/2008 |
| DE | 10 2009 006 250 A1 | 10/2009 |
| DE | 10 2009 023 645 A1 | 12/2010 |
| EP | 1 077 158 A1 | 2/2001 |
| FR | 2 813 113 | 2/2002 |
| JP | 2011-157022 A | 8/2011 |
| JP | WO 2011099640 A1 * | 8/2011 ............... F21K 9/52 |

OTHER PUBLICATIONS

International Search Report for Application No. PCT/EP2013/053682, dated May 24, 2013, with English translation.

Chinese Office Action issued in counterpart Chinese Application No. 201380014167.7 dated Nov. 20, 2015, with English translation (eighteen (18) pages).

Chinese Office Action issued in counterpart Chinese Application No. 201380014167.7 dated Aug. 2, 2016 with English translation (18 pages).

* cited by examiner

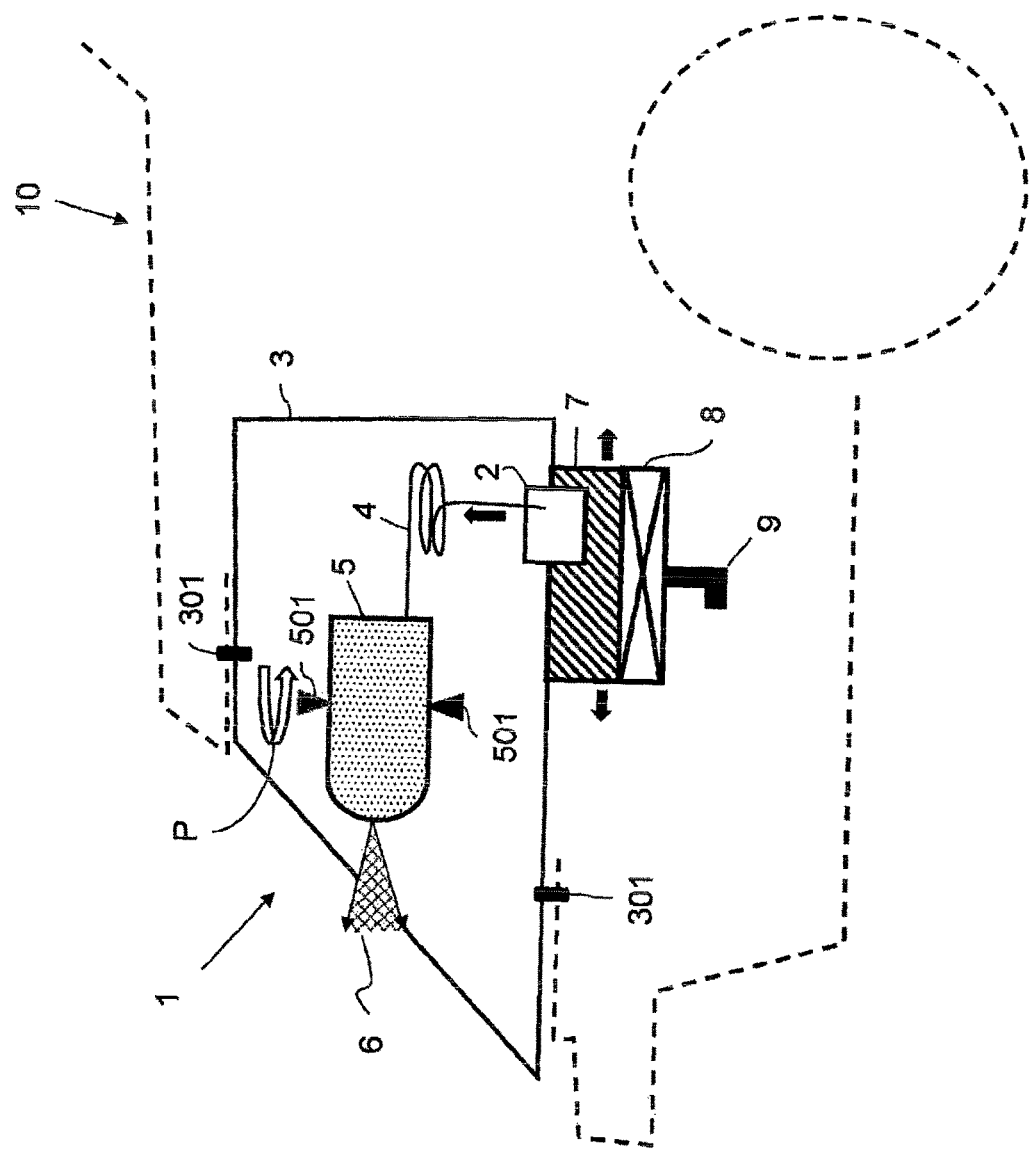

ILLUMINATION DEVICE FOR A MOTOR VEHICLE

CROSS REFERENCE TO RELATED APPLICATIONS

This application is a continuation of PCT International Application No. PCT/EP2013/053682, filed Feb. 25, 2013, which claims priority under 35 U.S.C. § 119 from German Patent Application No. 10 2012 205 435.9, filed Apr. 3, 2012, the entire disclosures of which are herein expressly incorporated by reference.

BACKGROUND AND SUMMARY OF THE INVENTION

The invention relates to an illumination device for a motor vehicle including a light source constructed of a number of semiconductor diodes and including an optical device arranged in a housing for generating a pre-defined light distribution from the light of the light source.

Today, in the field of motor vehicle engineering, there is increasing usage of illumination devices based on semiconductor diodes, especially in the form of LEDs. Normally the light source made of semiconductor diodes is combined with an optical device that generates the light distribution of the illumination device to form one unit that is built into the housing of the illumination device. It has proved to be a drawback that by integrating the light source and the optical device in one unit, the exchange of a defective light source is complicated because, for this to happen, the entire unit must be removed from the housing of the illumination device.

The object of the invention is to create a novel illumination device for a motor vehicle, the components of which are more easily accessible, at least in part.

This and other objects are achieved according to the invention by providing an illumination device for a motor vehicle including a light source constructed of a number of semiconductor diodes and including an optical device arranged in a housing for generating a pre-defined light distribution from the light of the light source. The light source is rigidly connected to the housing. At least one optical waveguide is provided that guides the light of the light source to the optical device.

The inventive illumination device is provided for a motor vehicle, in particular a privately operated vehicle, and possibly also a truck. It includes a light source made from a number of semiconductor diodes and includes an optical device arranged in a housing for generating a pre-defined light distribution from the light of the light source. The structure of such an optical device is known per se and may be different depending on the application. In particular, the optical device may include one or a plurality of reflectors (e.g. half-shell reflectors) and/or one or a plurality of lenses for generating the appropriate light distribution.

The inventive illumination device is distinguished in that the light source is rigidly connected to the housing and, furthermore, at least one optical waveguide is provided for guiding the light of the light source to the optical device. The light source is thus preferably a separate unit that is separated from the optical device. It is easier to disassemble and exchange the light source due to the rigid connection of the light source to the housing. The optical waveguide ensures that the light of the light source travels to the optical device.

The light source preferably includes a plurality of semiconductor diodes, and especially 3 to 8 semiconductor diodes. It is also possible, however, for the light source to include only one diode. In one preferred embodiment, the light source includes as semiconductor diode(s) one or more laser diodes and preferably exclusively just laser diodes. Laser diodes are distinguished by a very high light brightness and small structural dimensions. Preferably, laser diodes that each have a power of at least 1 W and, in particular, between 1.5 and 5 W, are used in the inventive illumination device.

In one particularly preferred embodiment, the at least one optical waveguide is a flexible optical fiber cable. Particularly simple assembly and disassembly of the light source and the optical device is assured due to the flexibility of the optical fiber cable. In particular, when using a flexible optical fiber cable, there is no need for a complex mechanical design to ensure the incidence of the light from the light source into the optical device.

In another preferred embodiment of the invention, monochromatic light is produced with the light source, wherein a conversion element for converting the monochromatic light to white light is provided. Such conversion elements are known per se. For instance, with blue laser diodes having an emission wavelength of 450 nm/405 nm, a phosphorous conversion element made of nitride phosphor, oxide nitride phosphor or cerium-doped YAG phosphor may be used for generating white light.

The conversion element, which is embodied in particular as a layer, may be arranged at different positions depending on the design of the invention. In particular, the conversion element may be positioned at an end of the at least one optical waveguide and disposed adjacent to the light source or even at an end of the at least one optical waveguide and disposed remote from the light source.

In another preferred embodiment of the inventive illumination device, a sensor for detecting the light intensity in the optical waveguide is provided at one end of the at least one optical waveguide, disposed remote from the light source. This creates the opportunity to detect defects of the light source or the transmission segment to the optical device in a simple manner via a single sensor, and thus to detect malfunctions. In particular, a malfunction is established when the detected light intensity is below a predetermined threshold value that permits it to be concluded that there is a defect in the light source or in the optical waveguide.

In another preferred embodiment of the invention, the light source is attached (directly) to the housing. Because of this, the light source is particularly easy to access and is easy to disassemble. The attachment of the light source to the housing is preferably designed such that the light source may be removed from outside of the housing. In particular, at least part of the light source is not enclosed by the housing, so that the accessibility of the light source is further improved.

In one preferred variant of the inventive illumination device, a heat sink is provided at the light source for cooling the light source, wherein the heat sink is preferably thermally coupled to cooler parts of the motor vehicle. The term heat sink shall be understood in a very broad context and may include both active and passive cooling devices or a combination of such cooling devices. At least part of the heat sink is preferably arranged outside of the housing so that the heat sink may be cooled using external air. In one particularly preferred variant, the heat sink includes a passive cooling body that preferably includes surface area-enlarging elements, such as, e.g., ribs, fins and/or pins, for effective cooling.

For improving cooling capacity, in another embodiment of the invention, a fan is provided at the heat sink for producing an air flow. In another variant, the heat sink is connected to an air guide for supplying cooling air to the heat sink. This variant may be combined in particular with a heat sink that has a fan so that the air guide acts as an intake guide through which the fan draws in air from a cooler area in the motor vehicle.

In another embodiment of the inventive illumination device, the optical device is movable, and in particular is pivotable and/or rotatable, inside the housing. The movement of the optical device may be effected, e.g., using an electric motor that is preferably controlled via a control device of the motor vehicle. In this manner it is possible to realize functionalities such as an adaptive light, a cornering lamp, and the like.

In another embodiment of the invention, the optical device is a self-contained unit or a module that may be removed as a whole from the illumination device. Thus permits the optical device to be exchanged in a simple manner when there are defects.

The inventive illumination device may assume different functionalities depending on the application. In one embodiment, the illumination device forms a headlight. A headlight is distinguished in that it actively illuminates the surroundings of the vehicle. In some cases it is possible for the inventive illumination device also to form an indicator or signal light that is distinguished in that it merely provides a signal for other motorists. In one preferred variant, the illumination device is embodied such that during operation a low beam characteristic is generated as a pre-defined light distribution. It is also possible for the illumination device to be embodied such that during operation it generates a high beam characteristic as the pre-defined light distribution.

In addition to the inventive illumination device, the invention furthermore relates to a motor vehicle that includes one or more of the inventive illumination devices.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic depiction of one embodiment of the inventive illumination device in the form of a headlight.

DETAILED DESCRIPTION OF THE DRAWING

FIG. 1 is a sectional view through a front headlight 1 that is built into the front region of a vehicle 10 indicated by the broken line.

The headlight 1 includes a light source 2 that is arranged on the bottom of the headlight housing 3. The back side of the light source 2 projects from the housing 3. The housing 3 is held at its bottom side and top side in the vehicle 10 via fixation devices 301, which are merely indicated schematically. The light source 2 is embodied as a laser light source and includes a plurality of laser diodes. Such laser diodes require significantly stronger cooling compared to conventional LEDs. Laser diodes may only be operated in ambient temperatures of up to about 80° C., while LEDs may have an operating range of up to 100° C. For cooling the laser diodes, in the embodiment of FIG. 1, a cooling unit 7 is provided that shall be explained in greater detail further below. Instead of a laser light source, in the embodiment in FIG. 1, it is also possible to use a light source made of conventional LEDs or a combination of laser diodes and LEDs.

The light from the light source 2 is guided via a flexible optical fiber cable 4, which preferably comprises one or a plurality of glass fibers, to an optical device in the form of a module 5 that contains a secondary optics unit, in accordance with which the corresponding light distribution 6 of the headlight 1 is generated from the light of the light source 2. Corresponding optics units for generating pre-defined light distributions are known per se and shall not be explained in detail. In particular, in such optics units suitable optical elements are built in the form of reflectors and/or lenses.

In the exemplary embodiment in FIG. 1, the module 5 is a self-contained unit that may be pivoted about a vertical and possibly also a horizontal axis via rotational elements 501, as is indicated by the arrow P. Using this, the light distribution may be adjusted as suitable and the functionality of a cornering light, an adaptive headlight, and the like may be realized. The laser diodes in the light source 2 produce monochromatic light, wherein the headlight 1 however generates a white light distribution. For converting the monochromatic light into white light, a conversion layer is provided at one end of the optical fiber cable 4. Depending on the embodiment, this conversion layer may be provided at the end of the cable adjacent to the light source 2 or at the end of the cable adjacent to the module 5.

As already stated above, the light source 2 is cooled via a cooling unit 7. The cooling unit 7 includes a cooling body made of a material that conducts heat well, especially metal. Preferably fins, ribs and/or pins are provided on the cooling body in order to thereby increase its surface area and to ensure that the heat from the light source is removed well. For an efficient supply of cooling air, in the embodiment in FIG. 1, furthermore provided is an electrically operated fan 8 that leads air via an intake tube 9 from a cooling region of the engine compartment to the cooling body. It is also possible for an active heat-pumping cooling device, e.g. a Peltier element, to be provided instead of a passive heat-conducting cooling body or in addition to such a passive cooling body.

The embodiment of the invention described in the foregoing has a number of advantages. Due to the flexible fiber coupling between the optical device 5 and the light source 2 arranged rigidly on the housing, the light source may be easily disassembled and the optical device may be adjusted precisely while simultaneously being highly variable. The flexibility of the optical fiber cable permits the entire optical device to be pivoted and oriented inside the illumination device. Furthermore, the ends of the optical fiber cable may be mechanically connected simply and precisely to the optical device or the light source. In addition, exchangeability of the light source is significantly easier to realize. Moreover, possible defects in the waveguide cable or the light source may be detected in a simple manner using a light intensity sensor at the cable end disposed adjacent to the optical device.

REFERENCE LIST

1 Illumination device
2 Light source
3 Housing
301 Fixation means
4 Optical fiber cable
5 Optical device 501 Rotational element
6 Light distribution
7 Cooling unit
8 Fan
9 Intake guide
10 Motor vehicle
P Arrow The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An illumination device for a motor vehicle, comprising:
a housing;
a light source constructed of a number of semiconductor diodes and having a light emission end located within the housing or at an aperture in a wall of the housing;
an optical device separate from and arranged in the housing and arranged to be movable relative to the housing and to the light source by a rotational element extending between the optical device and an immediately adjacent inner wall of the housing, the optical device being designed to generate a predefined light distribution from light of the light source; and
at least one flexible optical waveguide located entirely within the housing between the light source and the optical device, the at least one flexible optical waveguide being designed to receive in the housing and guide the light of the light source to the optical device, wherein
the light source is rigidly connected to a heat sink outside of the housing, and
an optical device end of the at least one flexible optical waveguide is located at the optical device in a manner such that there is no relative movement between the optical device and the optical device end when the optical device moves relative to the housing.

2. The illumination device according to claim 1, wherein the number of semiconductor diodes comprises one or more laser diodes.

3. The illumination device according to claim 2, wherein the number of semiconductor diodes comprises exclusively laser diodes.

4. The illumination device according to claim 1, wherein the at least one flexible optical waveguide is an optical fiber cable.

5. The illumination device according to claim 1, wherein the light source produces monochromatic light, the illumination device further comprising:
a conversion element arranged in the illumination device to convert the monochromatic light of the light source to white light.

6. The illumination device according to claim 5, wherein the conversion element is arranged at one end of the at least one flexible optical waveguide, which one end is either adjacent to the light source or remote from the light source.

7. The illumination device according to claim 1, further comprising:
a sensor that detects light intensity in the at least one flexible optical waveguide, the sensor being arranged at one end of the at least one flexible optical waveguide remote from the light source.

8. The illumination device according to claim 1, wherein the light source is removably connected to the housing.

9. The illumination device according to claim 1, wherein at least a portion of the light source extends outside of the housing.

10. The illumination device according to claim 1, wherein the heat sink is thermally coupled to a part of the motor vehicle that is cooler than the heat sink.

11. The illumination device according to claim 10, wherein the heat sink comprises a cooling body having cooling ribs, fins and/or pins.

12. The illumination device according to claim 10, further comprising:
a fan configured to produce an airflow at the heat sink.

13. The illumination device according to claim 12, further comprising:
an air guide coupled with the heat sink, the air guide supplying air to the heat sink.

14. The illumination device according to claim 10, further comprising:
an air guide coupled with the heat sink, the air guide supplying air to the heat sink.

15. The illumination device according to claim 1, wherein the optical device is movable within the housing.

16. The illumination device according to claim 1, wherein the optical device comprises a module configured to be removed as a whole from the illumination device.

17. The illumination device according to claim 1, wherein the illumination device forms a headlight.

18. The illumination device according to claim 1, wherein the illumination device forms an indicator light.

19. A motor vehicle, comprising:
one or more illumination devices, each illumination device comprising:
a housing;
a light source constructed of a number of semiconductor diodes and having a light emission end located within the housing or at an aperture in a wall of the housing;
an optical device separate from and arranged in the housing and arranged to be movable relative to the housing and to the light source by at least one rotational element extending between the optical device and an immediately adjacent inner wall of the housing, the optical device being designed to generate a predefined light distribution from light of the light source; and
at least one flexible optical waveguide located within the housing between the light source and the optical device, the at least one flexible optical waveguide being designed to receive in the housing and guide the light of the light source to the optical device, wherein
the light source is rigidly connected to a heat sink outside of the housing, and
an optical device end of the at least one flexible optical waveguide is located at the optical device in a manner such that there is no relative movement between the optical device and the optical device end when the optical device moves relative to the housing.

* * * * *